US008003184B2

(12) United States Patent
Ugolick

(10) Patent No.: US 8,003,184 B2
(45) Date of Patent: Aug. 23, 2011

(54) CLEAN EDGED CARDS ON PLASTIC CARRIER

(75) Inventor: Ronald Ugolick, San Dimas, CA (US)

(73) Assignee: Avery Dennison Corporation, Pasadena, CA (US)

( * ) Notice: Subject to any disclaimer, the term of this patent is extended or adjusted under 35 U.S.C. 154(b) by 234 days.

(21) Appl. No.: 11/836,061

(22) Filed: Aug. 8, 2007

(65) Prior Publication Data

US 2007/0275204 A1 Nov. 29, 2007

Related U.S. Application Data

(60) Continuation-in-part of application No. 11/510,636, filed on Aug. 25, 2006, now Pat. No. 7,501,170, which is a division of application No. 10/233,283, filed on Aug. 28, 2002, now Pat. No. 7,514,134.

(51) Int. Cl.
*B32B 7/06* (2006.01)

(52) U.S. Cl. .......................................... 428/43; 428/141

(58) Field of Classification Search .................... 428/43, 428/77, 136, 141
See application file for complete search history.

(56) References Cited

U.S. PATENT DOCUMENTS 1,949,259 A 2/1934 Salsman
2,082,494 A * 6/1937 Heck ................................ 462/73
2,166,352 A 7/1939 Hamilton
2,434,545 A 1/1948 Brady, Jr et al.
3,038,597 A 6/1962 Brady, Jr
3,072,024 A 1/1963 Wengel
3,267,780 A 8/1966 Roth
3,288,006 A 11/1966 Erlandson
3,338,199 A 8/1967 Taylor
3,568,829 A 3/1971 Brady
3,769,147 A * 10/1973 Komendat et al. .............. 428/56
3,790,744 A 2/1974 Bowen
3,896,246 A 7/1975 Brady
3,985,927 A 10/1976 Norris et al.
4,005,810 A 2/1977 Porter
4,048,736 A 9/1977 Castleman et al.
4,128,430 A 12/1978 Newman et al.
4,176,572 A 12/1979 Pennington
4,264,662 A 4/1981 Taylor et al.
4,380,564 A 4/1983 Cancio et al.
(Continued)

FOREIGN PATENT DOCUMENTS

DE 19519584 12/1996
(Continued)

OTHER PUBLICATIONS

Preliminary amendment dated May 20, 2005 from related U.S. Appl. No. 11/134,724.

(Continued)

*Primary Examiner* — Alexander Thomas

(57) ABSTRACT

A card sheet includes a top material having weakened separation lines and a carrier material of at least one layer of polymer. The weakened separation lines define the borders of cards. The carrier material is directly applied on an inner surface of the top material. The top material has an outer printable surface. The card sheet is constructed so as to allow the cards to be separated from the carrier material at an interface between the top material and the carrier material to form separate or separable cards after a printing operation on the printable surface.

17 Claims, 7 Drawing Sheets

U.S. PATENT DOCUMENTS

| | | | |
|---|---|---|---|
| 4,397,704 | A | 8/1983 | Frick |
| 4,428,857 | A | 1/1984 | Taylor et al. |
| 4,457,199 | A | 7/1984 | Corcoran |
| 4,465,729 | A | 8/1984 | Cancio et al. |
| 4,494,435 | A | 1/1985 | Lindsay |
| 4,524,894 | A | 6/1985 | Leblond |
| 4,732,069 | A | 3/1988 | Wood et al. |
| 4,833,122 | A | 5/1989 | Doll et al. |
| 4,863,772 | A | 9/1989 | Cross |
| 4,873,643 | A | 10/1989 | Powell et al. |
| 4,910,070 | A | 3/1990 | Al'Hariri |
| 4,979,612 | A | 12/1990 | Melbye |
| 5,001,106 | A | 3/1991 | Egashira et al. |
| 5,007,191 | A | 4/1991 | Klein |
| 5,031,939 | A | 7/1991 | Webendorfer et al. |
| 5,087,405 | A | 2/1992 | Maker |
| 5,090,733 | A | 2/1992 | Bussiere |
| 5,132,915 | A | 7/1992 | Goodman |
| 5,160,573 | A | 11/1992 | Takagi et al. |
| 5,178,419 | A | 1/1993 | Bolnick et al. |
| 5,198,275 | A | 3/1993 | Klein |
| 5,220,858 | A | 6/1993 | Allen et al. |
| 5,238,269 | A | 8/1993 | Levine |
| 5,275,868 | A | 1/1994 | Popat et al. |
| 5,284,689 | A | 2/1994 | Laurash et al. |
| 5,296,279 | A | 3/1994 | Birnbaum et al. |
| 5,318,325 | A | 6/1994 | Ipsen |
| 5,328,269 | A | 7/1994 | Mutolo et al. |
| 5,366,250 | A | 11/1994 | Sunabe |
| 5,389,414 | A | 2/1995 | Popat |
| 5,398,580 | A | 3/1995 | Gerhardt et al. |
| 5,407,893 | A | 4/1995 | Koshizuka |
| 5,413,532 | A | 5/1995 | Raby |
| 5,428,423 | A * | 6/1995 | Clark .............................. 355/77 |
| 5,487,568 | A | 1/1996 | Ipsen |
| 5,530,793 | A | 6/1996 | Watkins |
| 5,560,966 | A | 10/1996 | Kishimoto et al. |
| 5,571,587 | A | 11/1996 | Bishop et al. |
| 5,665,504 | A | 9/1997 | Malhotra |
| 5,702,789 | A | 12/1997 | Fernandez-Kirchberger et al. |
| 5,709,913 | A | 1/1998 | Anderson et al. |
| 5,727,817 | A | 3/1998 | Kraige |
| 5,830,529 | A | 11/1998 | Ross |
| 5,853,837 | A | 12/1998 | Popat |
| 5,861,201 | A | 1/1999 | Blackwelder et al. |
| 5,914,165 | A | 6/1999 | Freedman |
| 5,936,227 | A | 8/1999 | Truggelmann |
| 5,947,368 | A | 9/1999 | Thresher et al. |
| 5,993,928 | A | 11/1999 | Popat |
| 5,997,680 | A | 12/1999 | Popat |
| 5,997,683 | A | 12/1999 | Popat |
| 6,016,618 | A | 1/2000 | Attia et al. |
| 6,039,356 | A | 3/2000 | Warther et al. |
| 6,071,030 | A | 6/2000 | Hunter et al. |
| 6,159,568 | A | 12/2000 | Freedman et al. |
| 6,164,851 | A | 12/2000 | Sakamoto et al. |
| 6,173,649 | B1 | 1/2001 | Onishi |
| 6,284,708 | B1 | 9/2001 | Oshima et al. |
| 6,308,630 | B1 | 10/2001 | Kurokawa et al. |
| 6,358,587 | B1 | 3/2002 | Saint et al. |
| 6,380,132 | B1 | 4/2002 | Mihara et al. |
| 6,627,286 | B1 | 9/2003 | Lutz |
| 6,638,635 | B2 * | 10/2003 | Hattori et al. ................. 428/500 |
| 6,827,373 | B2 | 12/2004 | Zumberge |
| 7,037,564 | B1 * | 5/2006 | Abron .......................... 428/40.1 |
| 7,377,996 | B2 | 5/2008 | Bilodeau |
| 7,579,076 | B2 | 8/2009 | Ishikawa |
| 2001/0003609 | A1 | 6/2001 | Takada et al. |
| 2001/0006714 | A1 | 7/2001 | Bull et al. |
| 2001/0007703 | A1 | 7/2001 | Weirather et al. |
| 2001/0036525 | A1 | 11/2001 | Yokokawa |
| 2002/0178940 | A1 | 12/2002 | Kitchin et al. |
| 2003/0148056 | A1 | 8/2003 | Utz |
| 2003/0232191 | A1 | 12/2003 | Ishikawa |
| 2004/0018305 | A1 | 1/2004 | Pagano et al. |
| 2004/0209029 | A1 | 10/2004 | Utz et al. |
| 2005/0087977 | A1 | 4/2005 | Crum |
| 2005/0089664 | A1 | 4/2005 | Utz et al. |
| 2005/0095388 | A1 | 5/2005 | Utz et al. |
| 2005/0175807 | A1 | 8/2005 | Bilodeau |
| 2005/0208254 | A1 | 9/2005 | Yokokawa |
| 2006/0028015 | A1 | 2/2006 | Ray |
| 2006/0035020 | A1 | 2/2006 | Hennen |
| 2006/0286335 | A1 | 12/2006 | Utz et al. |
| 2007/0114789 | A1 | 5/2007 | Morrish |
| 2007/0141292 | A1 | 6/2007 | Utz et al. |
| 2007/0196623 | A1 | 8/2007 | Bilodeau et al. |
| 2007/0275204 | A1 | 11/2007 | Ugolick |

FOREIGN PATENT DOCUMENTS

| | | | |
|---|---|---|---|
| DE | 29805481 | | 8/1998 |
| DE | 19813314 | | 9/1999 |
| DE | 29907361 | | 2/2000 |
| DE | 4240825 | | 7/2000 |
| DE | 19945254 | | 8/2001 |
| DE | 10142043 | | 4/2003 |
| DE | 69909841 | | 5/2004 |
| EP | 0377289 | A2 | 12/1989 |
| EP | 0688006 | | 9/1996 |
| EP | 0894621 | | 2/1999 |
| EP | 0987195 | | 3/2000 |
| EP | 0987670 | | 3/2000 |
| EP | 1274619 | | 1/2003 |
| FR | 1586336 | | 2/1970 |
| FR | 2797607 | | 2/2001 |
| GB | 2376205 | | 12/2005 |
| JP | H05-318672 | | 12/1993 |
| JP | 2004-017541 | | 1/2004 |
| WO | 88/07737 | | 10/1988 |
| WO | 94/20944 | | 9/1994 |
| WO | 00/16978 | | 3/2000 |
| WO | 2000-013888 | | 3/2000 |
| WO | 2000-032412 | | 6/2000 |
| WO | 00/46316 | | 8/2000 |
| WO | 2001-010701 | | 2/2001 |

OTHER PUBLICATIONS

Preliminary amendment dated Oct. 31, 2005 from related U.S. Appl. No. 11/134,724.

Restriction requirement dated Apr. 3, 2006 from related U.S. Appl. No. 11/134,724.

Amendment dated Apr. 26, 2006 from related U.S. Appl. No. 11/134,724.

Non-final office action dated Jun. 1, 2006 from related U.S. Appl. No. 11/134,724.

Amendment dated Jun. 22, 2006 from related U.S. Appl. No. 11/134,724.

Non-final office action dated Sep. 14, 2006 from related U.S. Appl. No. 11/134,724.

Amendment dated Jan. 12, 2007 from related U.S. Appl. No. 11/134,724.

Final office action dated Apr. 17, 2007 from related U.S. Appl. No. 11/134,724.

Amendment dated Jul. 16, 2007 from related U.S. Appl. No. 11/134,724.

Non-final office action dated Sep. 27, 2007 from related U.S. Appl. No. 11/134,724.

Amendment dated Nov. 8, 2007 from related U.S. Appl. No. 11/134,724.

Supplemental amendment dated Nov. 15, 2007 from related U.S. Appl. No. 11/134,724.

Final office action dated Feb. 6, 2008 from related U.S. Appl. No. 11/134,724.

Amendment dated Mar. 19, 2008 from related U.S. Appl. No. 11/134,724.

Non-final office action dated May 14, 2008 from related U.S. Appl. No. 11/134,724.

Amendment dated Aug. 14, 2008 from related U.S. Appl. No. 11/134,724.

Final office action dated Jan. 13, 2009 from related U.S. Appl. No. 11/134,724.

Amendment dated Jul. 13, 2009 from related U.S. Appl. No. 11/134,724.

Non-final office action dated Sep. 2, 2009 from related U.S. Appl. No. 11/134,724.
Amendment dated Dec. 2, 2009 from related U.S. Appl. No. 11/134,724.
Interview summary dated Dec. 7, 2009 from related U.S. Appl. No. 11/134,724.
Interview summary dated Jan. 5, 2010 from related U.S. Appl. No. 11/134,724.
Notice of allowance dated Mar. 8, 2010 from related U.S. Appl. No. 11/134,724.
Interview summary dated Mar. 8, 2010 from related U.S. Appl. No. 11/134,724.
Amendment dated Jun. 7, 2010 from related U.S. Appl. No. 11/134,724.
Notice of allowance dated Jun. 16, 2010 from related U.S. Appl. No. 11/134,724.
Amendment dated Jul. 26, 2010 from related U.S. Appl. No. 11/134,724.
Notice of allowance dated Aug. 6, 2010 from related U.S. Appl. No. 11/134,724.
Non-final office action dated May 27, 2004 from related U.S. Appl. No. 09/801,187.
Amendment dated Jun. 15, 2004 from related U.S. Appl. No. 09/801,187.
Non-final office action dated Sep. 14, 2004 from related U.S. Appl. No. 09/801,187.
Amendment dated Jan. 14, 2005 from related U.S. Appl. No. 09/801,187.
Supplemental mendment dated Jun. 24, 2005 from related U.S. Appl. No. 09/801,187.
Office action dated Sep. 7, 2005 from related U.S. Appl. No. 09/801,187.
Non-final office action dated Feb. 9, 2006 from related U.S. Appl. No. 09/801,187.
Interview summary dated May 23, 2006 from related U.S. Appl. No. 09/801,187.
Amendment dated Jul. 12, 2006 from related U.S. Appl. No. 09/801,187.
Final office action dated Oct. 12, 2006 from related U.S. Appl. No. 09/801,187.
Amendment dated Feb. 21, 2007 from related U.S. Appl. No. 09/801,187.
Non-final office action dated May 3, 2007 from related U.S. Appl. No. 09/801,187.
Amendment dated Nov. 2, 2007 from related U.S. Appl. No. 09/801,187.
Final office action dated Jan. 28, 2008 from related U.S. Appl. No. 09/801,187.
Amendment dated Apr. 11, 2008 from related U.S. Appl. No. 09/801,187.
Non-final office action dated Jun3 3, 2008 from related U.S. Appl. No. 09/801,187.
Amendment dated Sep. 15, 2008 from related U.S. Appl. No. 09/801,187.
Final office action dated Dec. 4, 2008 from related U.S. Appl. No. 09/801,187.
Amendment dated Dec. 11, 2008 from related U.S. Appl. No. 09/801,187.
Advisory action dated Dec. 29, 2008 from related U.S. Appl. No. 09/801,187.
Amendment dated Dec. 29, 2008 from related U.S. Appl. No. 09/801,187.
Amendment dated Jun. 3, 2009 from related U.S. Appl. No. 09/801,187.
Restriction requirement dated Jul. 21, 2009 from related U.S. Appl. No. 09/801,187.
Interview summary dated Aug. 13, 2009 from related U.S. Appl. No. 09/801,187.
Amendment dated Aug. 17, 2009 from related U.S. Appl. No. 09/801,187.
Non-final office action dated Sep. 22, 2009 from related U.S. Appl. No. 09/801,187.
Amendment dated Dec. 14, 2009 from related U.S. Appl. No. 09/801,187.
Interview summary dated Jan. 4, 2010 from related U.S. Appl. No. 09/801,187.
Notice of allowance dated Mar. 26, 2010 from related U.S. Appl. No. 09/801,187.
Amendment dated Jun. 24, 2010 from related U.S. Appl. No. 09/801,187.
Notice of allowance dated Jul. 6, 2010 from related U.S. Appl. No. 09/801,187.
Preliminary amendment dated Feb. 8, 2007 from related U.S. Appl. No. 11/703,895.
Final office action dated Jul. 19, 2007 from related U.S. Appl. No. 11/703,895.
Interview summary dated Oct. 22, 2007 from related U.S. Appl. No. 11/703,895.
Amendment dated Oct. 23, 2007 from related U.S. Appl. No. 11/703,895.
Final office action dated Nov. 13, 2007 from related U.S. Appl. No. 11/703,895.
Amendment dated Apr. 14, 2008 from related U.S. Appl. No. 11/703,895.
Final office action dated May 5, 2008 from related U.S. Appl. No. 11/703,895.
Amendment dated Jul. 1, 2008 from related U.S. Appl. No. 11/703,895.
Office action dated Jul. 11, 2008 from related U.S. Appl. No. 11/703,895.
Amendment dated Nov. 24, 2008 from related U.S. Appl. No. 11/703,895.
Final office action dated Dec. 5, 2008 from related U.S. Appl. No. 11/703,895.
Notice of abandonment dated Jul. 10, 2009 from related U.S. Appl. No. 11/703,895.
Preliminary amendment dated Aug. 25, 2006 from related U.S. Appl. No. 11/510,636.
Non-final office action dated Jul. 19, 2007 from related U.S. Appl. No. 11/510,636.
Amendment dated Nov. 19, 2007 from related U.S. Appl. No. 11/510,636.
Final office action dated Dec. 7, 2007 from related U.S. Appl. No. 11/510,636.
Amendment dated Apr. 7, 2008 from related U.S. Appl. No. 11/510,636.
Non-final office action dated Apr. 21, 2008 from related U.S. Appl. No. 11/510,636.
Amendment dated May 13, 2008 from related U.S. Appl. No. 11/510,636.
Final office action dated Jul. 1, 2008 from related U.S. Appl. No. 11/510,636.
Amendment dated Nov. 26, 2008 from related U.S. Appl. No. 11/510,636.
Notice of allowance dated Dec. 18, 2008 from related U.S. Appl. No. 11/510,636.
Supplemental notice of allowance dated Jan. 12, 2009 from related U.S. Appl. No. 11/510,636.
Preliminary amendment dated Nov. 30, 2004 from related U.S. Appl. No. 11/001,560.
Restriction requirement dated Jul. 6, 2006 from related U.S. Appl. No. 11/001,560.
Amendment dated Jul. 28, 2006 from related U.S. Appl. No. 11/001,560.
Notice of non-compliant amendment dated Aug. 4, 2006 from related U.S. Appl. No. 11/001,560.
Amendment dated Aug. 15, 2006 from related U.S. Appl. No. 11/001,560.
Restriction requirement dated Sep. 1, 2006 from related U.S. Appl. No. 11/001,560.
Amendment dated Sep. 8, 2006 from related U.S. Appl. No. 11/001,560.
Non-final office action dated Oct. 11, 2006 from related U.S. Appl. No. 11/001,560.

Interview summary dated Feb. 1, 2007 from related U.S. Appl. No. 11/001,560.
Amendment dated Mar. 16, 2007 from related U.S. Appl. No. 11/001,560.
Supplemental amendment dated Mar. 19, 2007 from related U.S. Appl. No. 11/001,560.
Final office action Apr. 17, 2007 from related U.S. Appl. No. 11/001,560.
Amendment dated Jul. 11, 2007 from related U.S. Appl. No. 11/001,560.
Non-final office action dated Jul. 19, 2007 from related U.S. Appl. No. 11/001,560.
Amendment dated Nov. 14, 2007 from related U.S. Appl. No. 11/001,560.
Final office action dated Dec. 10, 2007 from related U.S. Appl. No. 11/001,560.
Amendment dated Feb. 21, 2008 from related U.S. Appl. No. 11/001,560.
Non-final office action dated Mar. 11, 2008 from related U.S. Appl. No. 11/001,560.
Amendment dated May 13, 2006 from related U.S. Appl. No. 11/001,560.
Final office action dated Jun. 24, 2008 from related U.S. Appl. No. 11/001,560.
Amendment dated Dec. 17, 2008 from related U.S. Appl. No. 11/001,560.
Non-final office action dated Jan. 9, 2009 from related U.S. Appl. No. 11/001,560.
Amendment dated Jan. 28, 2009 from related U.S. Appl. No. 11/001,560.
Notice of allowance dated Mar. 10, 2009 from related U.S. Appl. No. 11/001,560.
Preliminary amendment dated May 6, 2004 from related U.S. Appl. No. 10/841,072.
Preliminary amendment dated Oct. 25, 2006 from related U.S. Appl. No. 10/841,072.
Restriction Requirement dated Jun. 15, 2007 from related U.S. Appl. No. 10/841,072.
Amendment dated Jun. 29, 2007 from related U.S. Appl. No. 10/841,072.
Non-final office action dated Sep. 24, 2007 from related U.S. Appl. No. 101841,072.
Amendment dated Apr. 14, 2008 from related U.S. Appl. No. 10/841,072.
Non-final office action dated Sep. 18, 2008 from related U.S. Appl. No. 10/841,072.
Amendment dated Dec. 11, 2008 from related U.S. Appl. No. 10/841,072.
Restriction requirement dated Mar. 18, 2009 from related U.S. Appl. No. 10/841,072.
Amendment dated Apr. 16, 2009 from related U.S. Appl. No. 10/841,072.
Final office action dated Aug. 21, 2009 from related U.S. Appl. No. 10/841,072.
Amendment dated Nov. 23, 2009 from related U.S. Appl. No. 10/841,072.
Restriction requirement dated Jan. 6, 2010 from related U.S. Appl. No. 10/841,072.
Amendment dated Jan. 12, 2010 from related U.S. Appl. No. 10/841,072.
Non-final office action dated Apr. 16, 2010 from related U.S. Appl. No. 10/841,072.
Amendment dated Oct. 18, 2010 from related U.S. Appl. No. 10/841,072.
Preliminary amendment dated Oct. 24, 2007 from related U.S. Appl. No. 11/923,432.
Restriction requirement dated Aug. 19, 2008 from related U.S. Appl. No. 11/923,432.
Amendment dated Spe. 15, 2008 from related U.S. Appl. No. 11/923,432.
Restriction requirement dated Jan. 8, 2009 from related U.S. Appl. No. 11/923,432.
Amendment dated Jan. 26, 2009 from related U.S. Appl. No. 11/923,432.
Non-final office action dated May 12, 2009 from related U.S. Appl. No. 11/923,432.
Amendment dated Aug. 11, 2009 from related U.S. Appl. No. 11/923,432.
Office action dated Dec. 9, 2009 from related U.S. Appl. No. 11/923,432.
Amendment dated Dec. 15, 2009 from related U.S. Appl. No. 11/923,432.
Notice of allowance dated Feb. 9, 2010 from related U.S. Appl. No. 11/923,432.
Preliminary amendment dated Nov. 15, 2004 from related U.S. Appl. No. 10/990,306.
Non-final office action dated Jun. 6, 2005 from related U.S. Appl. No. 10/990,306.
Amendment dated Jul. 1, 2005 from related U.S. Appl. No. 10/990,306.
Final office action dated Jul. 19, 2005 from related U.S. Appl. No. 10/990,306.
Amendment dated Jul. 29, 2005 from related U.S. Appl. No. 10/990,306.
Non-final office action dated Aug. 12, 2005 from related U.S. Appl. No. 10/990,306.
Amendment dated Oct. 31, 2005 from related U.S. Appl. No. 10/990,306.
Final office action Nov. 15, 2005 from related U.S. Appl. No. 10/990,306.
Amendment dated Jan. 11, 2006 from related U.S. Appl. No. 10/990,306.
Non-final office action dated Feb. 1, 2006 from related U.S. Appl. No. 10/990,306.
Interview summary dated Apr. 27, 2006 from related U.S. Appl. No. 10/990,306.
Amendment dated May 30, 2006 from related U.S. Appl. No. 10/990,306.
Final office action dated Jun. 27, 2006 from related U.S. Appl. No. 10/990,306.
Amendment dated Sep. 12, 2006 from related U.S. Appl. No. 10/990,306.
Non-final office action dated Oct. 13, 2006 from related U.S. Appl. No. 10/990,306.
Amendment dated Jan. 16, 2007 from related U.S. Appl. No. 10/990,306.
Interview summary dated Feb. 1, 2007 from related U.S. Appl. No. 10/990,306.
Non-final office action dated Feb. 13, 2007 from related U.S. Appl. No. 10/990,306.
Interview summary dated May 30, 2007 from related U.S. Appl. No. 10/990,306.
Amendment dated Jun. 28, 2007 from related U.S. Appl. No. 10/990,306.
Final office action dated Jul. 19, 2007 from related U.S. Appl. No. 10/990,306.
Amendment dated Nov. 8, 2007 from related U.S. Appl. No. 10/990,306.
Interview summary dated Nov. 13, 2007 from related U.S. Appl. No. 10/990,306.
Supplemental amendment dated Nov. 20, 2007 from related U.S. Appl. No. 10/990,306.
Amendment dated Nov. 20, 2007 from related U.S. Appl. No. 10/990,306.
Non-final office action dated Dec. 10, 2007 from related U.S. Appl. No. 10/990,306.
Amendment dated May 12, 2008 from related U.S. Appl. No. 10/990,306.
Final office action dated Jul. 10, 2008 from related U.S. Appl. No. 10/990,306.
Amendment dated Dec. 10, 2008 from related U.S. Appl. No. 10/990,306.
Non-final office action dated Dec. 30, 2008 from related U.S. Appl. No. 10/990,306.

Amendment dated Jan. 27, 2009 from related U.S. Appl. No. 10/990,306.
Notice of Allowance dated Mar. 20, 2009 from related U.S. Appl. No. 10/990,306.
Preliminary amendment dated Jul. 18, 2003 from related U.S. Appl. No. 10/233,283.
Restriction requirement dated Sep. 17, 2003 from related U.S. Appl. No. 10/233,283.
Notice of allowance dated Mar. 30, 2004 from related U.S. Appl. No. 10/233,283.
Amendment dated Apr. 27, 2004 from related U.S. Appl. No. 10/233,283.
Non-final office action dated Sep. 14, 2004 from related U.S. Appl. No. 10/233,283.
Amendment dated Sep. 30, 2004 from related U.S. Appl. No. 10/233,283.
Notice of allowance dated Nov. 3, 2004 from related U.S. Appl. No. 10/233,283.
Supplemental notice of allowance dated Mar. 31, 2005 from related U.S. Appl. No. 10/233,283.
Amendment dated Jul. 29, 2005 from related U.S. Appl. No. 10/233,283.
Non-final office action dated Aug. 12, 2005 from related U.S. Appl. No. 10/233,283.
Amendment dated Oct. 31, 2005 from related U.S. Appl. No. 10/233,283.
Amendment dated Nov. 21, 2005 from related U.S. Appl. No. 10/233,283.
Notice of allowance dated 11/30/05 from related U.S. Appl. No. 10/233,283.
Amendment dated Dec. 22, 2005 from related U.S. Appl. No. 10/233,283.
Non-final office action dated Feb. 2, 2006 from related U.S. Appl. No. 10/233,283.
Amendment dated Jul. 3, 2006 from related U.S. Appl. No. 10/233,283.
Final office action dated Jul. 13, 2006 from related U.S. Appl. No. 10/233,283.
Amendment dated Jan. 13, 2007 from related U.S. Appl. No. 10/233,283.
Non-final office action dated Feb. 1, 2007 from related U.S. Appl. No. 10/233,283.
Amendment dated Jun. 29, 2007 from related U.S. Appl. No. 10/233,283.
Final office action dated Jul. 19, 2007 from related U.S. Appl. No. 10/233,283.
Amendment dated Nov. 16, 2007 from related U.S. Appl. No. 10/233,283.
Non-final office action dated Dec. 10, 2007 from related U.S. Appl. No. 10/233,283.
Amendment dated May 12, 2008 from related U.S. Appl. No. 10/233,283.
Notice of allowance dated Jul. 18, 2008 from related U.S. Appl. No. 101233,283.
Amendment dated Oct. 20, 2008 from related U.S. Appl. No. 10/233,283.
Notice of Allowance dated Oct. 24, 2008 from related U.S. Appl. No. 10/233,283.
Amendment dated Jan. 22, 2009 from related U.S. Appl. No. 10/233,283.
Notice of allowance dated Feb. 10, 2009 from related U.S. Appl. No. 101233,283.
Notice of allowance dated Apr. 22, 2009 from related Mexican Application No. 2004/001936.
Notice of intent to grant dated Jan. 27, 2009 from related European Application No. 02766164.4.
Office action dated Aug. 15, 2008 from related Chinese Divisional Application No. 200610135564.1.
Amendment dated Mar. 2, 2009 from related Chinese Divisional Application No. 200610135564.1.
Office action dated Apr. 3, 2009 from related Chinese Divisional Application No. 200610135564.1.
Amendment dated Jun. 17, 2009 from related Chinese Divisional Application No. 200610135564.1.
Office action dated Aug. 14, 2009 from related Chinese Divisional Application No. 200610135564.1.
Amendment dated Oct. 28, 2009 from related Chinese Divisional Application No. 200610135564.1.
Office action dated Jan. 8, 2010 from related Chinese Divisional Application No. 200610135564.1.
Amendment dated Mar. 22, 2010 from related Chinese Divisional Application No. 200610135564.1.
Office action dated May 4, 2010 from related Chinese Divisional Application No. 200610135564.1.
Amendment dated Jul. 15, 2010 from related Chinese Divisional Application No. 200610135564.1.
Patent issued Dec. 13, 2006 in related Chinese Application No. 02821438.2.
Examiner's report dated Mar. 5, 2010 from related Australian Divisional Application No. 2009/201432.
Amendment dated Apr. 9, 2009 from related Australian Application No. 2002/329910.
Notice of acceptance dated Apr. 30, 2009 from related Australian Application No. 2002/329910.
Preliminary amendment dated Mar. 8, 2001 from related U.S. Appl. No. 09/801,187.
Non-final office action dated Jun. 10, 2002 from related U.S. Appl. No. 09/801,187.
Amendment dated Nov. 25, 2002 from related U.S. Appl. No. 09/801,187.
Final office action dated Mar. 11, 2003 from related U.S. Appl. No. 09/801,187.
Amendment dated Jun. 27, 2003 from related U.S. Appl. No. 09/801,187.
Non-final office action dated Sep. 9, 2003 from related U.S. Appl. No. 09/801,187.
Amendment dated Mar. 4, 2004 from related U.S. Appl. No. 09/801,187.
Supplemental search report dated Oct. 26, 2006 from related European Application No. 02766164.4.
Examination report dated Jul. 30, 2007 from related European Application No. 02766164.4.
Office action dated Oct. 17, 2005 from related German Application No. 10127654.0.
Examination report dated Apr. 20, 2004 from related British Application No. 0113774.4.
International search report dated Jan. 3, 2003 from related International Application No. PCT/US2002/027518.
International preliminary exam report dated Dec. 19, 2003 from related International Application No. PCT/US2002/027518.
Written opinion dated Jul. 25, 2003 from related International Application No. PCT/US2002/027518.
Summons to oral hearing dated Mar. 12, 2008 from related European Application No. 02766164.4.
Examiner's report dated Nov. 14, 2007 from related Australian Application No. 2002/329910.
Office action dated Jun. 22, 2007 from related Canadian Application No. 2459036.
Interview summary dated May 10, 2006 from related U.S. Appl. No. 09/801,187.
Response dated Aug. 30, 2006 from related German Application No. 10127654.0.
Amendment dated Dec. 5, 2007 from related German Application No. 10127654.0.
Office action dated Mar. 10, 2009 from related German Application No. 10127654.0.
Amendment dated Jul. 13, 2009 rom related German Application No. 10127654.0.
Office action dated Jul. 18, 2003 from related French Application No. 0108593.
Response dated Oct. 7, 2005 from related U.S. Appl. No. 09/801,187.
Office action dated Oct. 25, 2004 from related British Application No. 0113774.4.
Office action dated Nov. 2, 2005 from related British Application No. 0113774.4.

Search report dated Dec. 17, 2001 from related British Application No. 0113774.4.
Office action dated Nov. 18, 2005 from related Chinese Application No. 02821438.2.
Notice of allowance dated Jan. 4, 2011 from related Chinese Application No. 200610135564.1.
Office action dated Jan. 19, 2011 from related Canadian Application No. 2459036.
Interview summary dated Oct. 22, 2007 from related U.S. Appl. No. 11/001,560.
Amendment dated Jun. 16, 2009 from related Australian Application No. 2009/201432.
Examiner's report dated Mar. 5, 2010 from related Australian Application No. 2009/201432.
Amendment dated Mar. 4, 2011 from related Australian Application No. 2009/201432.
Notice of acceptance dated Mar. 10, 2011 from related Australian Application No. 2009/201432.
Amendment dated Jul. 2, 2009 from related Australian Application No. 2009/201435.
Office action dated Mar. 24, 2010 from related Australian Application No. 2009/201435.
Amendment dated Mar. 21, 2011 from related Australian Application No. 2009/201435.
Notice of acceptance dated Mar. 30, 2011 from related Australian Application No. 2009/201435.
Amendment dated Dec. 22, 2008 from related Canadian Application No. 2459036.
Notice of allowance dated Feb. 25, 2010 from related Canadian Application No. 2459036.
Notice of abandonment dated Aug. 25, 2010 from related Canadian Application No. 2459036.
Request for reinstatement dated Nov. 1, 2010 from related Canadian Application No. 2459036.
Notice of reinstatement dated Nov. 18, 2010 from related Canadian Application No. 2459036.
Amendment dated Jun. 21, 2011 from related Canadian Application No. 2459036.
Decision to grant dated Jun. 12, 2009 from related European Application No. 02766164.4.
Office action dated Feb. 21, 2011 from related European Application No. 09006666.3.
Response dated Apr. 19, 2011 from related European Application No. 09006666.3.
Office action dated May 23, 2011 from related European Application No. 10010842.2.
Office action dated May 23, 2011 from related European Application No. 10010841.4.
Office action dated Feb. 19, 2009 from related Mexican Application No. 2004/001936.
Amendment dated Apr. 13, 2009 from related Mexican Application No. 20041001936.
Final office action dated Jan. 5, 2011 from related U.S. Appl. No. 10/841,072.
Amendment dated Apr. 5, 2011 from related U.S. Appl. No. 10/841,072.
Non-final office action dated Jun. 9, 2011 from related U.S. Appl. No. 10/841,072.
Preliminary amendment dated Jna. 14, 2011 from related U.S. Appl. No. 13/006,897.
Non-final office action dated May 5, 2011 from related U.S. Appl. No. 13/006,897.
Preliminary amendment dated Jan. 14, 2011 from related U.S. Appl. No. 13/006,952.
Interview summary dated May 9, 2011 from related U.S. Appl. No. 13/006,952.
Preliminary amendment dated Jan. 14, 2011 from related U.S. Appl. No. 13/006,980.
Preliminary amendment dated Jan. 14, 2011 from related U.S. Appl. No. 13/007,005.
Examination report dated Mar. 26, 2004 from related British Application No. 0113774.4.
Examination report dated Aug. 25, 2005 from related British Application No. 0113774.4.

* cited by examiner

FIG. 1
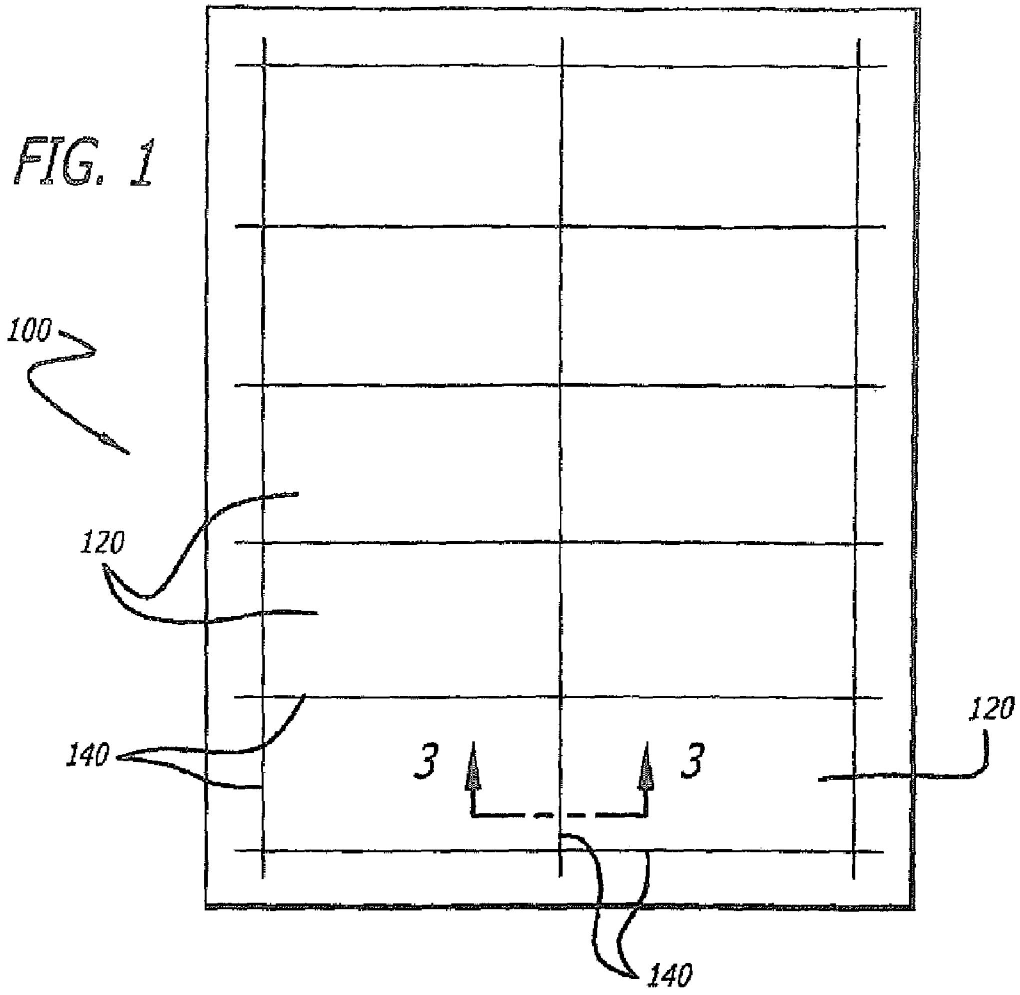
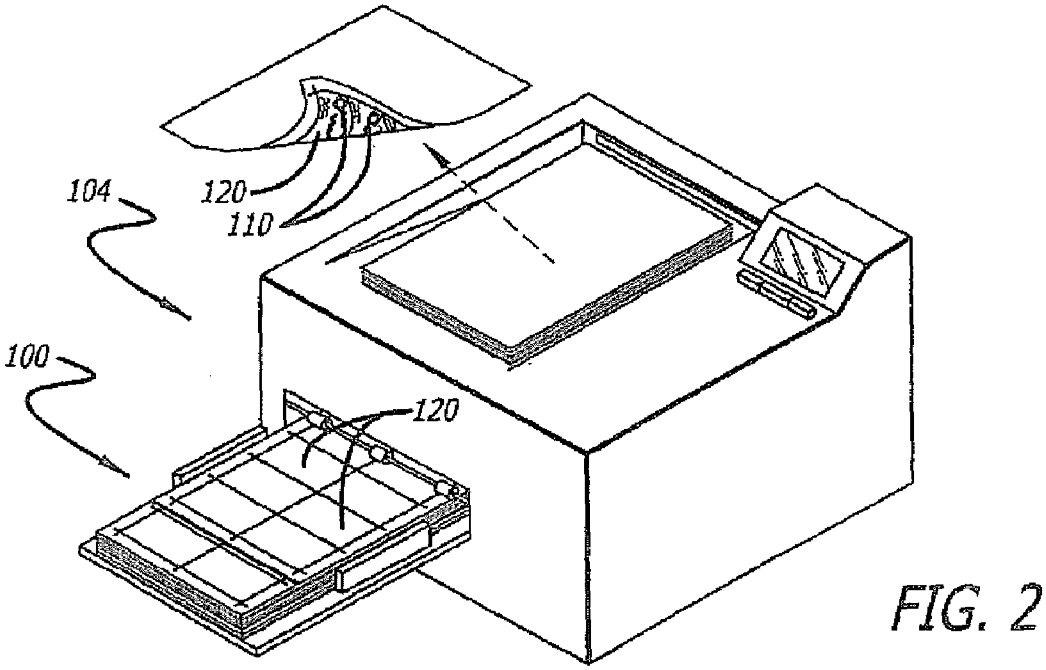
FIG. 2

CLEAN EDGED CARDS ON PLASTIC CARRIER

This application is a continuation-in-part of U.S. patent application Ser. No. 11/510,636, filed on Aug. 25, 2006 (now U.S. Pat. No. 7,501,170), which is a division of U.S. patent application Ser. No. 10/233,283, filed on Aug. 28, 2002 (now U.S. Pat. No. 7,514,134).

BACKGROUND OF THE INVENTION

The present invention relates to sheets of calling or business cards, photograph cards, post cards and the like, methods of making them and methods of using them.

The design of calling or business cards by simply printing them with commercially available laser or inkjet printers is of interest. Small size printable media, such as calling or business cards, cannot be individually printed with conventional laser or inkjet printers due to their small format. For this reason, for printing calling cards by means of a laser printer or an inkjet printer, card sheets are usually initially used, from which the calling cards are separated after having been printed, leaving a residual "matrix" of the card sheet. In these card sheets a supporting structure is provided for the cards and a wide variety of embodiments are known for such card sheets and carriers.

In a first class of card sheets, the matrix of the card sheet, or a portion of that matrix itself acts as the carrier for the cards. Thus, there are calling card sheets in which the material is microperforated and the card is broken out along the microperforations to separate the cards from the matrix. The cards to be separated are connected to the card sheet by material bridges comprising the microperforations. In another variation, only a few bridges connect the cards to one another and the matrix, generally at intersection of die cut lines, but also occasionally spaced along a die cut line. When the cards are separated from the card sheet, these bridges partially remain at the edges of the cards. These separation residues are unsightly and not desired especially for high-quality products, such as calling cards.

In one variation of this first class of card sheet product, instead of microperforations, the card sheet includes die cut lines penetrating much but not all of the card sheets ("substantially cut" lines), and cards are separated from the surrounding matrix by severing the uncut portions of the substantially cut lines. Another variation uses a multi-layer structure for the card sheet, wherein one of the layers acts as the carrier material. The cards are separated by "snap breaking" through the carrier material. Patent publications illustrating this first class of card products include: U.S. Pat. Nos. 5,853,837, 5,993,928 and 5,997,680 (Popat, commonly assigned herewith; substantially cut lines); see also United States Patent Applications 2001/0036525 A1 (Yokokawa; multilayer card structure) and 2003/0148056 (Utz, et al).

In a second class of card product designs, the cards are completely cut from the surrounding matrix by cut punching, and one or more additional structures are used as a carrier for the cut cards. The structure of such cut-punched calling card sheets results from a printable top material and a carrier material applied to one side of the top material, the carrier material being bonded to the cards and to the matrix to support the cards within the matrix. One example of this second class of card products uses relatively narrow carrier strips or tapes from which the printed card may be drawn off. The tapes may be applied to the punched lines along the short side of the (A4) sheet or formed by removing alternating ones of strips cut into the carrier before or after application to the sheet. The adhesive remains on the tapes when the card is drawn off. A disadvantage of this construction is that the top material/carrier connection is relatively unstable, which impairs the feeding and transportation behavior in the printer. In addition, there is the danger that tape fibers are torn-off by the action of removing the cards from the adhesive tape. This embodiment is shown in U.S. Pat. No. 5,702,789 (Fernandez-Kirchberger et al.).

Other versions of this second class of card sheet products use a "liner" sheet as the carrier, wherein the liner may be a full sheet corresponding to the top sheet, or may have sections removed from a full sheet. In so-called "dry-peel" constructions, the bond between the liner and the top sheet is created using an extruded polymer with a debondable interface to the liner sheet. When the cards are drawn off, the film remains on the back of the card, which impacts negatively the ability to accept handwriting or ink indicia. In removable or ultra-removable adhesive constructions, the bond is created using a removable or ultra-removable adhesive between the top sheet and the liner sheet. When the cards are drawn off from the carrier, the adhesive remains on the carrier and the backs of the cards remain free of adhesive. In another version, the adhesive bonding the liner and the top sheet may be a dry adhesive that may totally remain on the back of the top sheet upon separation of the top sheet and the liner, or may split between the top sheet and the liner, thereby remaining partially on the top sheet.

Alternatively, a method is known in which a calling card sheet, which initially was coated on the reverse side with a silicone layer, is fastened onto a carrier material with an adhesive. The calling card sheet is cut-punched and, after having been printed, the individual calling cards can be drawn-off from the carrier material. Due to the silicone layer, the adhesive remaining on the reverse side of the calling card can be avoided. These calling cards, however, have an altered smooth reverse side, which is undesirable. In addition, such a reverse side has the disadvantage that its writeability is inferior. A further disadvantage is that a card of this second class of card sheet products is easily bent when it is drawn off from the adhesive carrier. Examples of the second class of card sheet products and dry peel laminates are shown in U.S. Pat. No. 4,863,772 (Cross, commonly assigned herewith), and PCT Publication Nos. WO 00/16978 and WO 00/46316 (both of Avery Dennison Corporation).

SUMMARY OF THE INVENTION

Pursuant to one embodiment, the present invention is directed to card sheets, from which cards can be separated by simply separating them out from the card matrix, and peeling them away from the carrier sheet, with the cards having smooth edges. In another embodiment, a card is peeled from the carrier sheet, with the carrier sheet for the entire card matrix remaining intact. The front and the reverse sides of the cards of embodiments of present invention feel the same to the touch. The card sheet comprises a top material having punched or die cut lines, the front or outer surface of which is printable and on the reverse or inner surface of which a carrier material of at least one polymer layer is directly applied.

The (polymer) layer extruded on the top material cardstock can be poly-4-methyl-1-pentene (polymethyl pentene or TPX). Other materials may include any polymer that has physical properties that allow them to separate easily between the cards and delaminate cleanly from the cards. Alternatives include thirty-four MFI, extrusion coating grade polypropylene (PP) resin (Basell PDC-1292). Other alternatives include flexible, film-forming polymers, including but not limited to, polypropylene, polyethylene, polyolefins, polyesters, polyvinyichloride (PVC) polymers, polystyrenes, polycarbonates, natural and synthetic rubbers (such as natural latexes, SBR, SBS, SIS, etc.), and naturally occurring polymers such as polylactic acids and starches and compatible mixtures thereof The thicknesses of the top material and the carrier of an embodiment of the present invention allow for die cutting on the top, preferably through the top material but (preferably) not into the carrier. This allows for a clean separation in the top sheet with only a single folding action, without breaking the carrier. In other words, the user advantageously does not have to fold the card sheet back and forth to separate the top sheet. The single folding action, for example, can be backward, i.e. folding away from the die cut. After separating the top sheet and maintaining the backward folded position, the top material can be peeled and separated from the carrier. The resulting cards have no remnants of the carrier remaining after separation therefrom.

In another embodiment, the thickness of the top material and the carrier allows for die cutting preferably through the top material and preferably partially penetrating the carrier sheet. This facilitates separation of individual cards or rows or columns of cards from the card matrix by a simple back and/or forth motion. After a card is separated from the card sheet, the card and the carrier are delaminated by peeling the carrier from the card. In yet another embodiment, the carrier is a film that is stretchable. Stretching of the film effects release of the carrier from the card stock. In either of these means of removing the carrier, by peeling or stretching, all of the carrier is removed from the back of the card.

Possible resin materials for carriers include TPX, some of the polyethylenes (PE), such as high density polyethylene (HDPE), PP, polyesters including polyethylene terepthalate (PET) (there are several varieties of PET) and polystyrene and other resins that allow for delamination from the cards as described. The caliper of the sheet construction depends on the desired application, but for "cards", anywhere from about seven to twelve or fifteen mils might be reasonable.

Other advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a top plan view of a card sheet of an embodiment of the present invention;

FIG. 2 is a perspective view of a printer (or copier) showing a stack of card sheets of FIG. 1 being inserted therein and printed;

DETAILED DESCRIPTION

The term "front side" of the top material as used herein refers to the outer surface of the top material. The term "reverse side" of the top material as used herein refers to the inner surface of the top material.

A card sheet of an embodiment of the present invention is shown generally at 100 in FIG. 1. A stack of the card sheets 100 can be placed in the input tray of a printer (or copier) shown generically at 104 in FIG. 2. The desired indicia 110 can be printed on the cards 120 of the card sheet by the printer (or copier) 104.

Figure 3A:
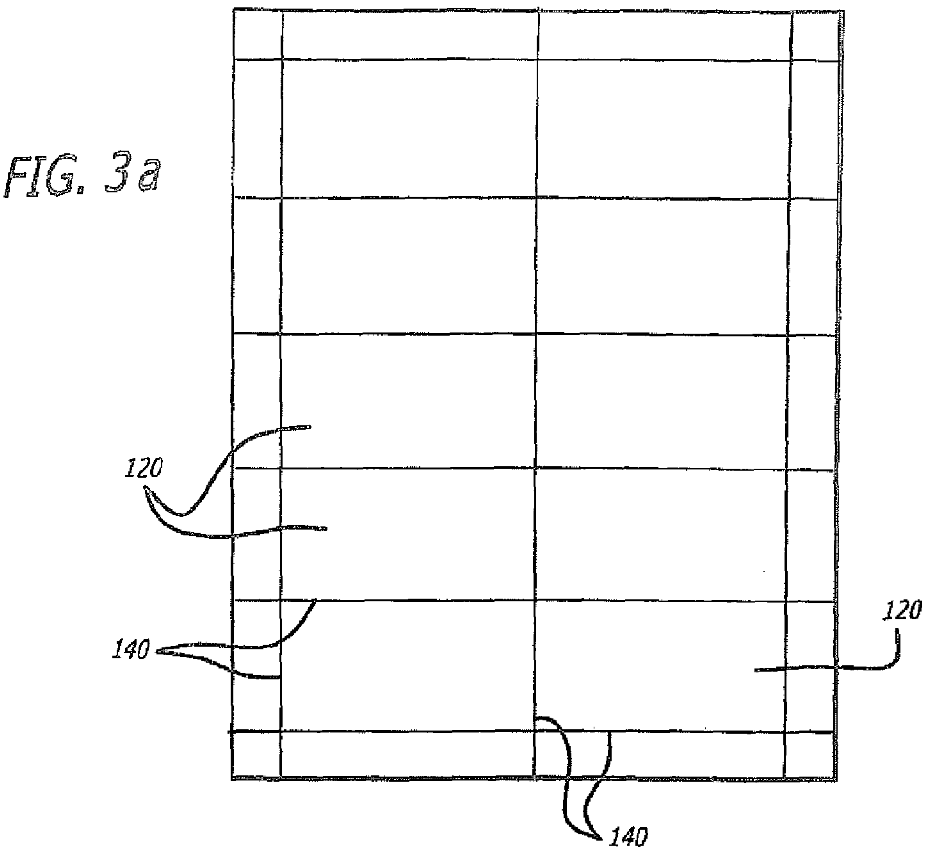
FIGS. 3*a*-3*b* show top and bottom plan views of a card sheet of another embodiment of the present invention.
Figure 3B:
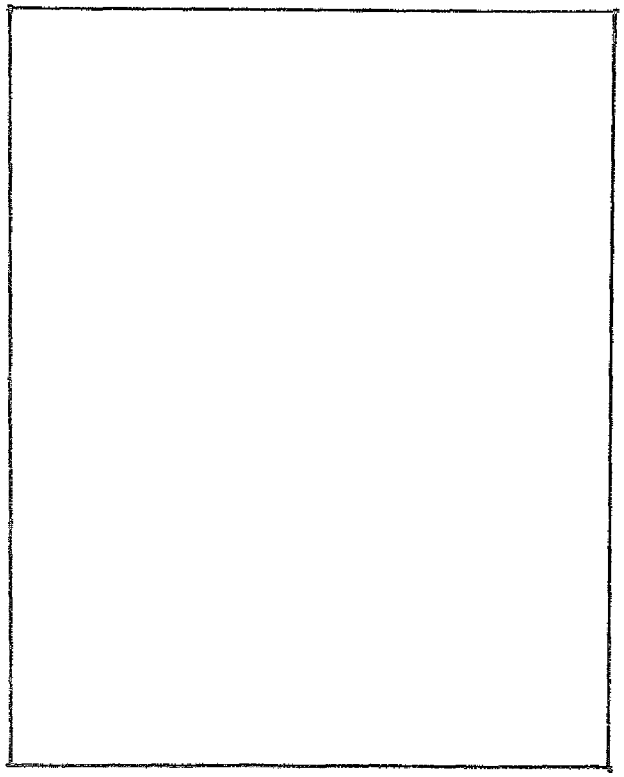

A card sheet of another embodiment of the present invention is shown generally in FIG. 3. The top plan view in FIG. 3*a* shows separations lines 140 across entire length and width of the card sheet, extending to the edge of the card sheet. The bottom plan view in FIG. 3*b* shows carrier material without any cuts through the carrier material.

Figure 4A:
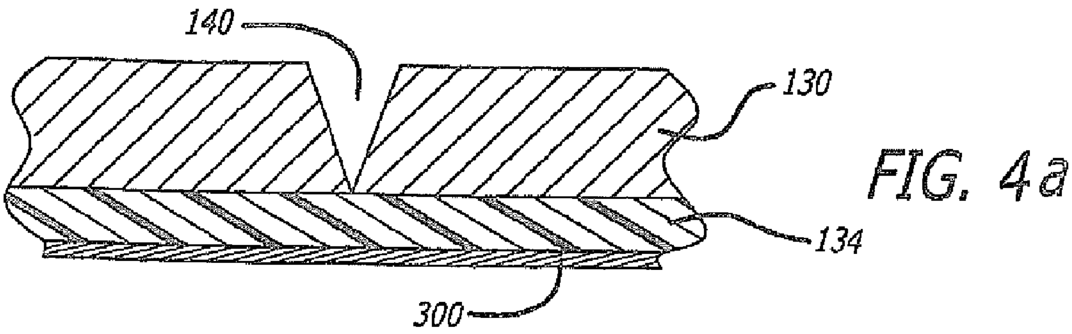
FIGS. 4*a*-4*c* show enlarged cross-sectional views of three embodiments of card sheet of FIG. 1 taken on line 3-3.
Figure 4B:
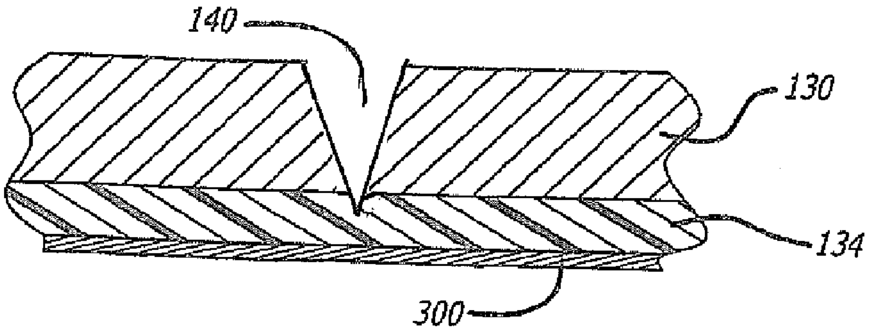
Figure 4C:
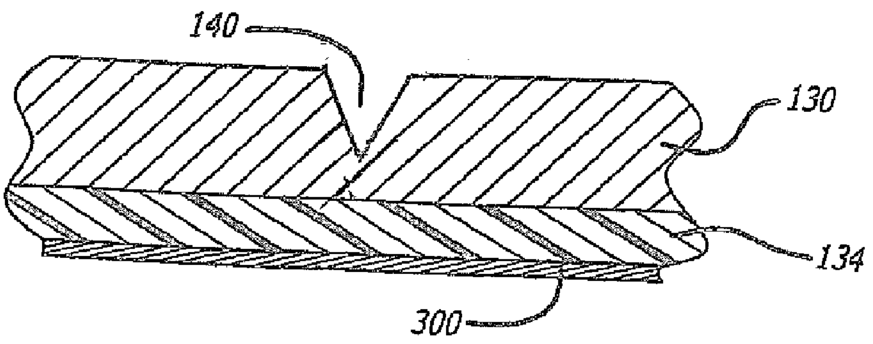

The card sheet 100 according to one embodiment of the invention comprises a top material 130 and a carrier material 134 directly applied to a bottom surface of the top material, as shown in the cross-sectional view of FIG. 4*a*. Weakened separation lines 140 (such as die cut lines) through the top material 130 define the borders of the cards 120. The cards 120 are attached to the carrier material 134. In another embodiment as shown in FIG. 4*b*, weakened separation lines 140 are present through the top material 130 and partially through the carrier material 134. In yet another embodiment as shown in FIG. 4*c*, weakened separation lines 140 are present partially through the top material 130.

A "printable top material" means materials that can be printed with an inkjet printer and/or a laser printer 104 or other commercial printing methods such as offset printing, and/or by writing instruments. (Writing instruments can include pens, pencils or the like.) As top material 130, generally any card materials may be used which can be printed with an inkjet printer and/or a laser printer 104. Such card materials can, for example, also be laminated, coated or uncoated, dull or glossy, marmorated or obliquely transparent or they can have a linen or other topographic structure. When the cards 120 are to be calling or business cards, a card material having a grammage of one hundred and sixty to two hundred and fifty g/m$^2$ is used. Non-limiting examples of card materials include matte coated paper available from Felix Schoeller Specialty Papers (Osnabrück, Germany) and photoreceptive papers from Kanzaki Specialty Papers (Springfield Mass.); as well as laser papers available from Kohler (Germany), Neusiedler Group (Austria), and Monadnock Paper Mills (New Hampshire). These types of papers, when used in conjunction with the carrier, have a caliper suitable for the desired use, such as business cards or photo cards. In addition, suitable thickness plastic materials may be used as card materials, with suitable print receptive top coatings as needed.

In order to separate individual cards 120 from the card sheet 100, the top material 130 has punched or die cut lines 140. On the other hand, the carrier layer 134 is not punched, though punching or die cutting (140) which dents but does not pierce or which penetrates only a slight distance can be used for certain embodiments. To provide a carrier material for cards punched within the card sheet 100, the carrier layer 134 is applied directly onto the inner surface of the top material 120 such as by extrusion. If the top material 130 has a grammage of one hundred and sixty to two hundred and fifty g/m$^2$, the carrier layer 134 applied thereto has a grammage of fifteen to forty-five g/m$^2$.

The separation of individual cards 120 from the card sheet 100 of an embodiment of the invention is carried out by bending along the punched lines 140 in the direction away from the top material. The card is then peeled and separated from the carrier sheet. Alternatively, the carrier sheet may be pulled away from the top material, thereby releasing the cards. In another embodiment, the top material is removed by stretching the carrier sheet.

Figure 5:
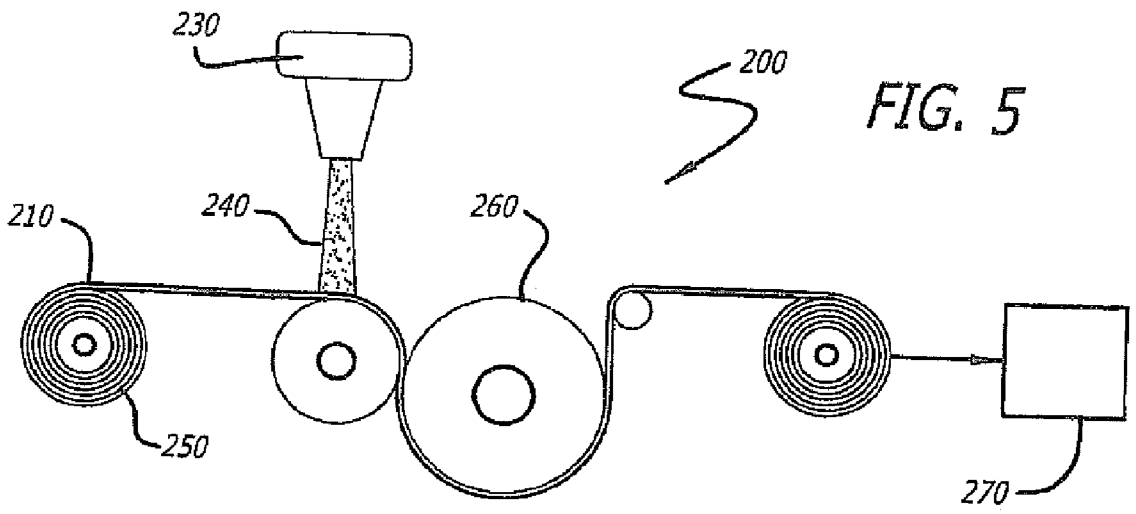
FIG. 5 is a schematic showing a process for manufacturing material suitable for manufacturing the card sheet of FIG. 1.

A simplified schematic view of a manufacturing process for a card sheet 100 is illustrated in FIG. 5 generally at 200. Referring thereto, the cardstock material 210 is combined with the polymer backing material without using adhesives, rather the polymer (e.g., TPX) is extruded directly onto the cardstock material. FIG. 5 shows an extrusion die 230 extruding the molten polymer 240 on the cardstock material coming off of a roll 250. The coated material is cooled down by a chill roll 260. The material is then delivered on-line to the converting equipment 270, where it is die cut, sheeted, and packaged. Alternatively, the coated material can be rolled into roll form and converted off-line at a later time or in another facility.

Generally, any polymer is suitable for the carrier layer 134 as long as it is not brittle and has the flexibility to bend to allow peeling and delamination of the cards. The polymer should also have the strength to withstand the pressure when die cuts are made on the top material. Polymers that can be used include polymethylpentene or TPX, polyolefins (such as polypropylene, polyethylenes and copolymers of propylene and ethylene), polyesters, polymethyl methacrylate, polystyrene and compatible mixtures thereof. Other materials may include any polymer that has physical properties that allow them to separate easily between the cards and delaminate cleanly from the cards after separation. Alternatives include thirty-four MFI, extrusion coating grade polypropylene (PP) resin (Basell PDC-1292). Other alternatives include flexible, film-forming polymers, including but not limited to, polypropylene, polyethylene, polyolefins, polyesters, PVCs, polystyrenes, polycarbonates, natural and synthetic rubbers (such as natural latexes, SBR, SBS, SIS, etc.), and naturally occurring polymers such as polylactic acids and starches and compatible mixtures thereof.

In another embodiment, the surface of the carrier layer 300 opposite the surface touching the card stock, i.e., the exposed surface of the carrier layer is modified as shown in FIG. 4. Modification of the exposed surface may result in good feeding and transportation behavior in the printer as by roughening of the exposed surface.

The surface roughness of the reverse side of the carrier layer 134 is determined by the chill roll 260 after extrusion. (The chill roll 260 is the roll that cools the melted polymer, as explained above.) By suitable selection of the chill roll 260, the surface roughness may be adjusted such that the reverse side of the carrier layer 134 may have good feeding and transportation behavior in the printer. A selection of the roughness such that the card sheets with the carrier layer 134 may be suited for feeding through a printer represents another embodiment of the invention.

In other words, the roughness of the carrier layer 134 is mainly provided by the structure of the chill roll 260 after extrusion—the rougher the chill roll, the rougher the carrier layer. Another method of roughening the surface 300 is to apply a coating to the backside of the sheet construction, that is, to the carrier layer 134.

The polymer layer 134 of the card sheet 100 according to the invention is directly applied to the reverse side of the top material by extrusion, as mentioned above. This allows the polymer layer 134 to stick to the top material 130 so that no contact adhesive layer therebetween is required to connect the top material to the polymer layer.

In another embodiment of the invention, the carrier material comprises two or more layers. Polymers that can be used for the two or more layers include polymethylpentene or TPX, polyolefins (such as polypropylene, polyethylenes and copolymers of propylene and ethylene), polyesters, polymethyl methacrylate, polystyrene and compatible mixtures thereof. Other materials may include any polymer that has physical properties that allow them to separate easily between the cards and delaminate cleanly from the cards after separation. Alternatives include thirty-four MFI, extrusion coating grade polypropylene (PP) resin (Basell PDC-1292). Other alternatives include flexible, film-forming polymer, including but not limited to, polypropylene, polyethylene, polyolefins, polyesters, PVCs, polystyrenes, polycarbonates, natural and synthetic rubbers (such as natural latexes, SBR, SBS, SIS, etc.), and naturally occurring polymers such as polylactic acids and starches and compatible mixtures thereof. In one embodiment, the carrier-material comprises two layers, with the first layer being TPX or polyethylene, the second layer being polyolefin.

Fillers may be included in the polymeric carrier layers. The fillers are used to alter the physical characteristics of the layers and may affect the cost of the polymeric layers. Fillers include any known in the art such as titanium dioxide, calcium carbonate, talc, and carbon black. The polymeric carrier layers may also include voids that may be gas-filled.

The cards 120 broken out of the card sheets 100, etc. according to an embodiment of the invention may be constructed and used as calling (business) cards, photograph cards, post cards or the like as would be apparent to those skilled in the art from this disclosure. Preferred length and width dimensions are 2×3.5 inches for business cards and 4×6, 5×7, 2×3 and 8×10 for photo cards. The card sheet itself can, for example, be 8½×11 inches, 8½×14 inches or A4 size.

The top material 130 can have a thickness of 150 μm to 250 μm. Workable thickness ranges for the carrier material 134 are twenty to fifty g/m$^2$ or twenty-five to sixty microns. The lower limit is important for converting. Regarding the higher limit: thicker polymers can be used when applied by lamination instead of extrusion; and for a single film construction (such as polycarbonate) which is semi-punched.

Figure 6A:
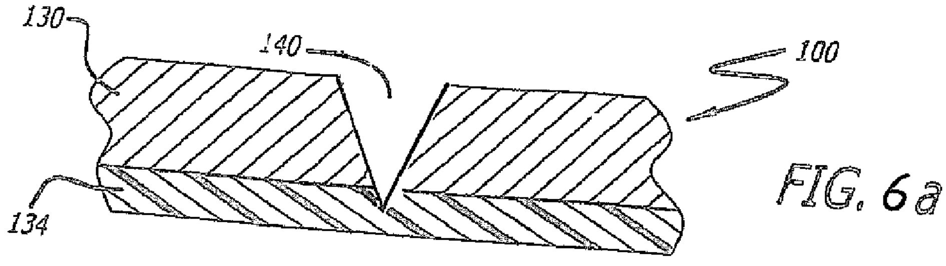
FIGS. 6*a*-6*d* show the separation mechanism of a card sheet of an embodiment of the invention wherein a card is first separated from the card sheet and then peeled from the carrier.
Figure 6B:
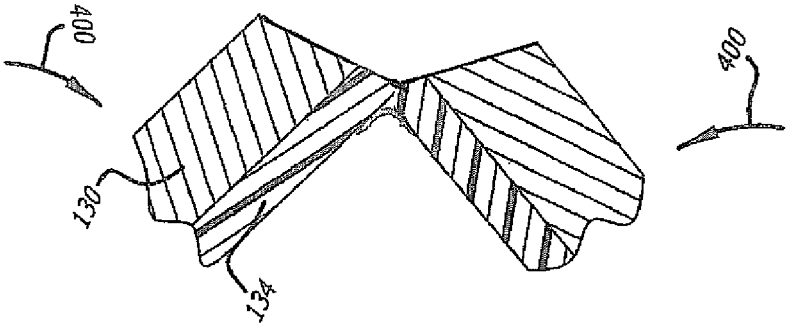
Figure 6C:
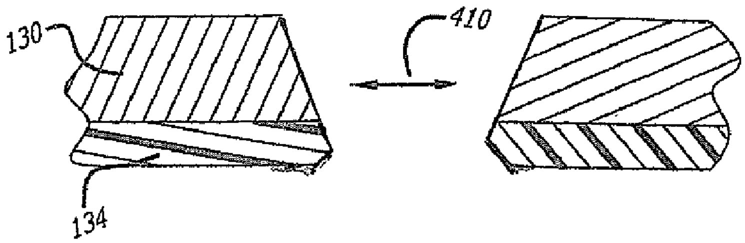
Figure 6D:
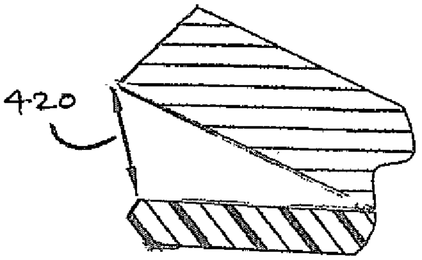

According to one embodiment of the invention, the mechanism for breaking a card sheet and delaminating the cards of the present invention is illustrated in FIGS. **6*a*, 6*b*, 6*c* and 6*d*. FIG. 6*a* shows a cross-section of a portion of a card sheet 100 of an embodiment of the present invention, after the sheet has been passed through a printer (or copier) 104 and the desired indicia printed on the top surface of the top material 130, which can be paper or cardstock. A weakened line 140 is illustrated through the top material and partially through the top surface of the (polymeric) carrier material 134. The weakened line may be die cut or made with a laser. To separate the individual cards from the rest of the sheet, the sheet is folded downwards or away from the top material 130 and about the weakened line 140 wherein the folding action is depicted in FIG. 6*b* by arrows 400. The bottom layer 134, as can be understood from FIG. 6*b*, compresses and folds. The individual cards are then separated from the card matrix as depicted by arrow 410 in FIG. 6*c*. The individual card is then delaminated from the carrier residing behind the card as depicted in FIG. 6*d* by arrow 420. A further embodiment may include the weakened line 140 not penetrating the top surface of the carrier material 134**.

Figure 7A:
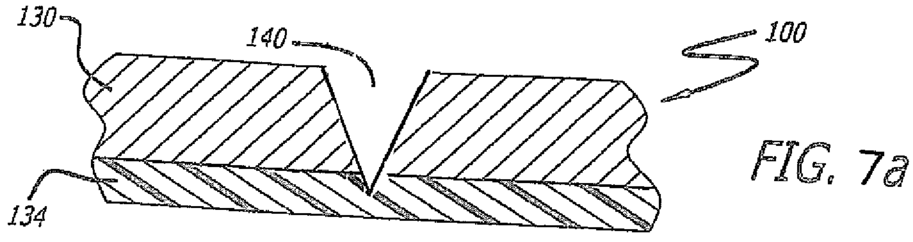
FIGS. 7*a*-7*c* show the fold-peel-separate mechanism steps of a card sheet of an embodiment of the invention.
Figure 7B:
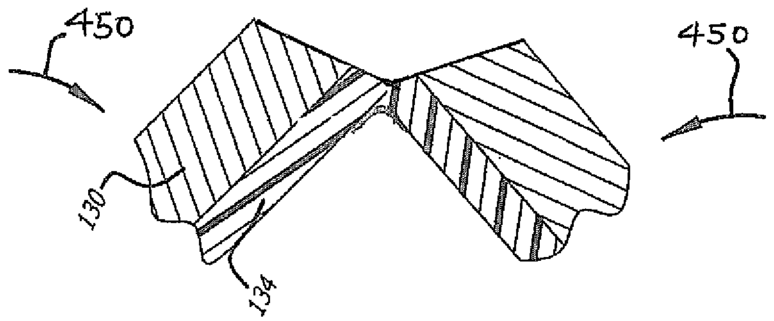
Figure 7C:
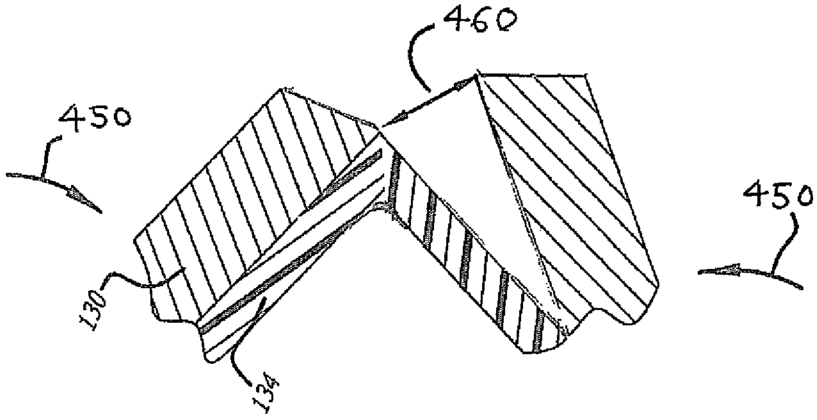

According to another embodiment of the invention, the mechanism for breaking a card sheet and delaminating the cards of the present invention is illustrated in FIGS. 7*a*, 7*b*, and 7*c*. FIG. 7*a* shows a cross-section of a portion of a card sheet 100 of an embodiment of the present invention, after the sheet has been passed through a printer (or copier) 104 and the desired indicia printed on the top surface of the top material 130, which can be paper or cardstock. A weakened line 140 is illustrated through the top material and to the top surface of the (polymeric) carrier material 134. The weakened line may be die cut or made with a laser. To separate the individual cards from the rest of the sheet, the sheet is folded downwards or away from the top material 130 and about the weakened line 140 wherein the folding action is depicted in FIG. 7*b* by arrows 450. The bottom layer 134, as can be understood from FIG. 7*c*, compresses and folds. The individual cards are then peeled and separated from the carrier material and the rest of the sheet as depicted in FIG. 7*c* by arrow 460. Yet another embodiment may have the weakened line 140 partially penetrating the top surface of the carrier material 134.

According to another embodiment of the invention, the weakened line 140 in either FIG. 6*a* or 7*a* does not penetrate the entire thickness of the top material 130. Folding the sheet as shown in either FIG. 6*b* or 7*b*, separates the remaining uncut top material, forming a clean edge. Separation of the individual cards may then be accomplished by following the steps shown in FIGS. 6*c* and 6*d* or FIG. 7*c*.

The invention is explained in detail by the following examples.

EXAMPLE 1

Polymethyl pentene (TPX) with a coating weight of twenty g/m$^2$ is extruded onto the reverse side of an A4 sheet consisting of 185 g/m$^2$ ivory board, which is suited to be printed with a laser printer and an inkjet printer. The sheet is punched on the front side in two rows of five calling or business cards each. The card is broken out by bending it away from the top material. The card is then peeled and separated from the carrier sheet.

EXAMPLE 2

TPX with a coating weight of twenty g/m$^2$ is extruded onto the reverse side of an A4 sheet consisting of 200 g/m$^2$ glossy cast-coated paper for inkjet photo prints. The reverse side of the sheet (the side onto which the polymer is extruded) is as smooth as the front side. The sheet is punched on the front side. The card is broken out by bending it away from the top material. The card is then peeled and separated from the carrier sheet.

EXAMPLE 3

A preformed polyethylene film with a coating weight of twenty g/m$^2$ is laminated using heat and/or pressure onto the reverse side of an A4 sheet consisting of 185 g/m$^2$ ivory board, which is suited to be printed with a laser printer and an inkjet printer. The sheet is punched on the front side in two rows of five calling or business cards each. The card is broken out by bending it away from the top material. The card is then delaminated from the carrier film by stretching the film.

Polymer Process Embodiments

General concepts common to each of the "polymer process" alternatives are that the paper is used as one layer, polymer or film as the second. The thickness of the paper or film depends on final product requirements. The total construction thickness can range from two to fifteen mils. Relative thicknesses of the layers can range from mostly paper with film coating to mostly film with thin layer of print-enabling material, such as paper or topcoating.

A. Melt Process

For the melt process a film-forming polymer, or polymer blend or alloy, is heated to a temperature above its flow point, conveyed while molten, to a means of contacting a web of paper, cooled and wound in a roll form. (See FIG. 5 and the corresponding discussions above.)

The polymer is chosen as above. Physical properties related to ease of folding are used to select appropriate polymers. Adhesion to the chosen paper is also used as a criterion for selecting the polymer. Adhesion should be sufficient to prevent debonding of the layers during/prior to printing, but low enough to allow clean removal from the facestock (cardstock) without splitting or tearing/pulling out of paper fibers from the facestock. An example utilizes TPX as the polymeric material. Other polymers that may also provide suitable properties include without limitation polyesters, polyolefins, polystyrenes, and polymethyl methacrylates. Alternatives include thirty-four MFI, extrusion coating grade polypropylene (PP) resin (Basell PDC-1292). Other alternatives include flexible, film-forming polymer, including but not limited to, polypropylene, polyethylene, polyolefins, polyesters, PVCs, polystyrenes, polycarbonates, natural and synthetic rubbers (such as natural latexes, SBR, SBS, SIS, etc.), and naturally occurring polymers such as polylactic acids and starches and compatible mixtures thereof.

The polymer(s) may be melted in a conventional melting apparatus including single screw extruders such as those manufactured by Davis-Standard, twin-screw extruders such as those manufactured by Leistritz, or heated pots or melters (by Nordson as an example). The exact temperature will depend on the materials' temperature stability and viscosity. Typical extruder conditions will depend on the materials but might include temperature ranges of 250° F. to 650° F. The molten polymer(s) are conveyed to a die by means of the extruder, a gear pump or any other suitable means. The die causes a sheet of molten polymer(s) to be formed, and this sheet is then deposited onto a paper or other substrate. The die may be in contact, or nearly so, with the substrate as in typical slot coating operations. Alternatively, the die may be located a distance from the substrate as in typical extrusion coating operations. The die may also have multiple channels to form multiple layers of polymer sheets. Additionally, a nip point may be employed to ensure good contact of the film and substrate. Alternatively, the polymer may be cast onto a chill roll prior, or contemporaneous, to contact with the facestock.

The paper chosen should provide additional properties that are required for the application. The paper may need to be die cut, textured, printed upon, erased and so forth. It may also need to be thick enough to provide the overall thickness required for the application. Treatment of the paper may be required for adhesion or print receptivity.

B. Solution Process

The "solution process" concept involves dissolving a suitable material or blend of materials in an appropriate solvent, coating the solution onto the paper, and then driving the solvent off. Conventional solvent coating means can be used. Generally, ovens operating at temperatures that depend on the choice of solvent are used in-line with the coating process in order to achieve a uniform, dry film. Fillers might also be useful.

An example of suitable coating materials are aqueous acrylic coatings produced by Rohm & Haas and sold under the trade name RHOPLEX, containing about 40% to 60% solids, applied by any means capable of metering the desired coat weight onto the desired substrate. The coating is subsequently dried at oven temperatures of about 150° C. to 160° C. to obtain 100% solids acrylic coating.

Figure 8:
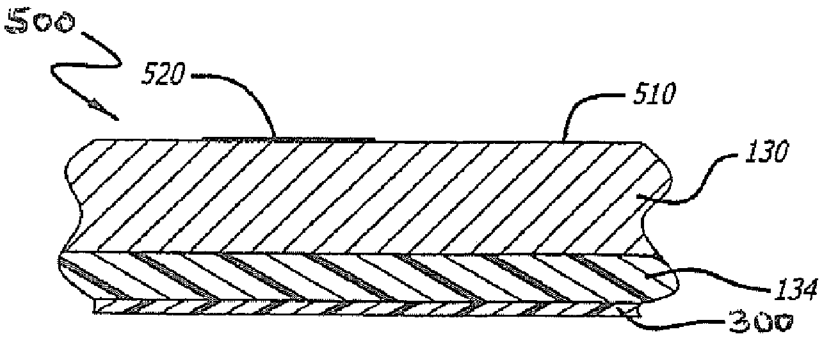
FIG. 8 shows an embodiment for use in printing photographs.

One use or construction of generally any of the above card sheet embodiments is printed business cards. Another is photo cards 500 (FIG. 8) which would have a photoreceptive surface 510 for receiving a photo image or photo printing 520. Examples of photoreceptive coated papers which can be used for the photo card sheets are those manufactured by Oji Paper Co., Ltd. (Tokyo, Japan), Mitsubishi Paper Mills Limited (Tokyo), Japan Pulp and Paper Company Limited (Tokyo), Zanders USA (Wayne, N.J.), and Sihl Paper Company (Switzerland). These are cast coated glossy papers, instant dry papers, photo quality papers and photorealistic papers. The coatings are swellable or microporous coatings.

Additionally, while the printing is generally done using inkjet or laser means, other methods include gravure, offset printing, and other press-type printing techniques. (Hand) writing is another method, and the rationale for it is that users may wish to quickly convey additional information informally, as needed, for example, personal telephone numbers on the backs of business cards. Printing press techniques can be used to standardize portions of the separable (sheet) members, while allowing personalization in other areas. A business card example of this technique is that a company has its logo printed on business card sheets. At a separate time, an employee can (hand) print his particular (individual) information on the card. Topcoats, corona treatment and other means by which the materials can be made inkjet and/or laser receptive can also be used to make the surface(s) receptive to other marking means (pen, pencil, etc.) as would be apparent to those skilled in the art from this disclosure.

Figure 9:
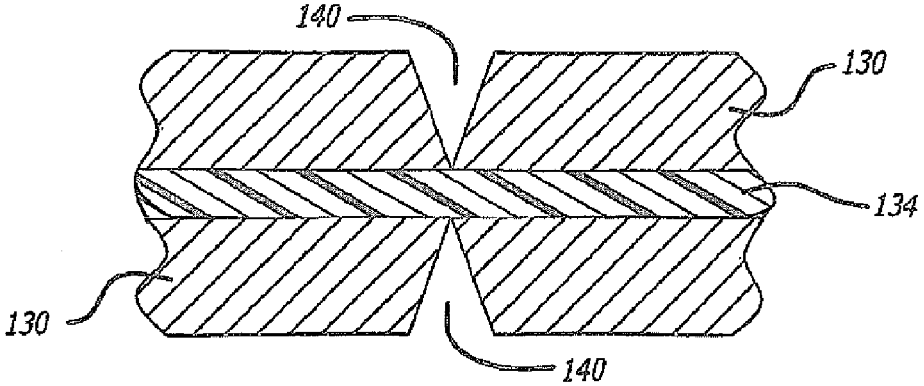
FIG. 9 is an enlarged cross-sectional view of an embodiment having top material on both sides of carrier material.

Another embodiment of the present invention is a card sheet having top material on both sides of the carrier material (FIG. 9). Although embodiments described herein are for traditional cards, the present invention is not so limited. It can be a thin sheet, as thin as four mils. The absence of a central flexible adhesive layer allows for such thin gauges. Rather, it can include other embodiments/uses (for parts of sheets) such as inserts on hanging file folders, which tend to be as thin as paper and are torn apart. The present invention can offer cleaner inserts. Other applications include CD jewel case inserts.

The card sheets of the present invention can be packaged in a box or a container. The box comprises at least one card sheet and at least one instruction sheet. The instruction sheet can have instructions for peeling and delaminating the cards from the carrier sheet. The instruction sheet can also have instructions on the use of the card sheet for writing or printing, e.g., method of feeding card sheet in a printer.

Thus, from the foregoing detailed description, it will be evident that there are a number of changes, adaptations and modifications of the present invention that come within the province of those skilled in the art. The scope of the invention includes any combination of the elements from the different species, embodiments, functions and/or subassemblies disclosed herein, as would be within the skill of the art. It is intended that all such variations not departing from the spirit of the inventions be considered as within the scope thereof.

What is claimed is:

1. A card sheet comprising:

a top material having a plurality of weakened separation lines defining a plurality of attached cards;

a stretchable carrier material of at least one layer of polymer;

the top material having an outer printable surface;

at least one of the weakened separation lines defining at least a portion of a border of at least one of the attached cards;

the stretchable carrier material being directly attached to an inner surface of the top material; and the card sheet being constructed so as to allow at least one of the attached cards to be separated from the stretchable carrier material at an interface between the top material and the stretchable carrier material to form a separate or separable card after a printing operation on the printable surface;

wherein the stretchable carrier material is sufficiently stretchable so as to at least partially release at least one of the attached cards therefrom in response to stretching of the stretchable carrier material.

2. The card sheet of claim 1 wherein the polymer is selected from a group consisting of polyethylene, polypropylene, polymethyl methacrylate, polyesters, polystyrenes and compatible mixtures thereof.

3. The card sheet of claim 1 wherein the printable surface includes a coating.

4. The card sheet of claim 1 wherein the card sheet is constructed to allow the card sheet to bend and separate at at least one of the weakened separation lines, and the separate or separable card peeled away from the stretchable carrier material.

5. The card sheet of claim 1 wherein an underside of the stretchable carrier material has a surface that is modified to adjust a roughness thereof so as to benefit transportation behavior of the sheet through a printer or copier.

6. The card sheet of claim 1 wherein the stretchable carrier material is directly attached to the top material by extrusion.

7. The card sheet of claim 1 wherein the stretchable carrier material is a film attached to the top material by pressure and/or heat.

8. The card sheet of claim 1 where at least one of the attached cards is made of paper or cardstock.

9. The card sheet of claim 1 wherein at least one of the attached cards has a photoreceptive surface for receiving a photo image or printing a photo.

10. The card sheet of claim 1 wherein the inner surface of the top material is paper.

11. The card sheet of claim 1 wherein said sheet is sized to fit in the input tray of a printer or copier.

12. The card sheet of claim 1 wherein the plurality of attached cards are arranged on the card sheet in a two-dimensional array.

13. The card sheet of claim 1 wherein the polymer is polymethyl pentene.

14. The card sheet of claim 1 wherein an outer-most exposed surface of the sheet is a surface of the stretchable carrier material opposite that surface of the stretchable carrier material directly attached to the inner surface of the top material.

15. The card sheet of claim 1 wherein the separate or separable card is free of remnants of the stretchable carrier material.

16. The card sheet of claim 1 wherein the separate or separable card is free of all of the stretchable carrier material.

17. A card sheet comprising:

a top material having an inner surface, an outer surface, and a plurality of weakened separation lines defining a plurality of attached cards;

a stretchable carrier material of at least one layer of polymer directly attached to the inner surface of the top material; and at least one of the weakened separation lines defining at least a portion of a border of at least one of the plurality of attached cards;

wherein the card sheet is constructed such that at least one of the plurality of attached cards is separable from the stretchable carrier material at an interface between the top material and the stretchable carrier material to form a separate card when the stretchable carrier material is stretched; and the separate card includes no stretchable carrier material after the separate card has been removed from the stretchable carrier material.

* * * * *